(12) United States Patent
Kulas

(10) Patent No.: US 8,862,183 B2
(45) Date of Patent: Oct. 14, 2014

(54) CAMERA INCLUDING IMAGE TRANSFER FOR COUPLING TO A HOST DEVICE

(71) Applicant: Charles J. Kulas, San Francisco, CA (US)

(72) Inventor: Charles J. Kulas, San Francisco, CA (US)

(*) Notice: Subject to any disclaimer, the term of this patent is extended or adjusted under 35 U.S.C. 154(b) by 5 days.

(21) Appl. No.: 13/659,788

(22) Filed: Oct. 24, 2012

(65) Prior Publication Data

US 2013/0178245 A1    Jul. 11, 2013

Related U.S. Application Data

(60) Provisional application No. 61/569,155, filed on Dec. 9, 2011.

(51) Int. Cl.
H04M 1/00    (2006.01)
H04M 1/02    (2006.01)

(52) U.S. Cl.
CPC .......... H04M 1/0264 (2013.01); H04M 1/0254 (2013.01)
USPC .................. 455/556.1; 455/575.1; 455/575.8; 455/572; 455/558

(58) Field of Classification Search
USPC .................. 455/556.1, 575.1, 575.8, 572, 558
See application file for complete search history.

(56) References Cited

U.S. PATENT DOCUMENTS

| 5,893,037 | A | * | 4/1999 | Reele et al. | 455/556.1 |
| 8,577,412 | B1 | * | 11/2013 | Bishop | 455/556.1 |
| 2002/0013161 | A1 | * | 1/2002 | Schaeffer et al. | 455/557 |
| 2012/0282977 | A1 | * | 11/2012 | Haleluk | 455/556.1 |
| 2012/0320340 | A1 | * | 12/2012 | Coleman, III | 351/208 |

OTHER PUBLICATIONS

LeapFrog Leapster Explorer Camera and Video Recorder, http://amazon.com/LeapFrog-Leapster-Explorer-Cameran-Recorder/dp/B0042MAKAW Oct. 24, 2012.

* cited by examiner

Primary Examiner — Sanh Phu

(57) ABSTRACT

Embodiments generally relate to a camera. In one embodiment, the camera includes a lens for enabling the camera to capture at least one image. The camera also includes a connector for mounting the camera onto a phone and for enabling the camera to communicate with the phone. The camera also includes a shutter button for triggering the camera to capture the least one image. The camera also activates the phone and puts the phone into a camera mode when the shutter button is pressed.

23 Claims, 4 Drawing Sheets

1

CAMERA INCLUDING IMAGE TRANSFER FOR COUPLING TO A HOST DEVICE

CLAIM OF PRIORITY

This application claims priority from U.S. Provisional Patent Application 61/569,155 entitled, "Dedicated Camera Functions For Host Device," filed Dec. 9, 2011, which is hereby incorporated by reference as if set forth in full in this application for all purposes.

BACKGROUND

Many conventional smart phones include a built-in digital camera. A built-in camera enables a user to use a smart phone for taking pictures without having to carry around a separate camera. A typical smart phone includes a camera lens and camera application, among other components. The display screen is used as a viewfinder and typically has a touch-screen shutter button.

To take a picture, a user typically pushes a button to turn the smart phone on or to wake the smart phone up if the smart phone is in sleep mode. Once the smart phone is on, or activated, the user then scrolls through a menu to find a camera application and then pushes a button to launch the camera application. The user may then have to select to turn a flash on or off, select video or still image mode, compose the picture in the display, etc. Additional controls may need to be manipulated or actions taken before the user can take a picture.

SUMMARY

In one embodiment, one or more camera functions are provided to a device. The device may be or include a phone, tablet computer or other handheld computing device, laptop computer or other movable computer, game console, music player, digital or analog camera, Global Positioning System (GPS) device, etc. The provided camera function(s) can provide new camera functionality to a host device or the provided camera function(s) may provide an improvement over camera functionality that is already present in the host device.

In one embodiment, a provided camera is a separate device from a host device such as a smart phone. The provided camera can be attached to or detached from the host device. The provided camera can be electronically coupled and mechanically attached to the smart phone or other device by using an electrical or data port or connector such as a Universal Synchronous Bus (USB) port. Other ports, plugs or connectors can be used. If a data connector is used to couple the provided camera to the host device then data can be exchanged between the two devices via the data connector. Otherwise, data can be exchanged with a wireless connection.

In one embodiment, the provided camera includes a viewfinder (e.g., with a lens or simply a through-hole), shutter button, lens, imaging device (e.g., a charge-coupled device or CCD), to take a picture the user simply looks through the viewfinder and presses the shutter button. There is no delay in powering up the phone or other host device and navigating to a camera function. Upon depressing the shutter button, a signal can be sent to the phone to activate the phone and start to put the phone into camera mode so that the user can transition to using the phone's camera or a camera function on the phone. When a picture is taken with the provided camera, the picture information can be transferred to the phone so that it is viewable and can be manipulated within the phone's user interface. Other features are described below An alternative embodiment allows the provided phone to be mounted to the camera more permanently than by using a data or electrical connector. For example, the provided camera can be integrated into a rear cover that snaps onto the phone (or other host device). The rear cover can include a protrusion out the top, bottom or side(s) of the phone and one or more protrusions can variously include the viewfinder, shutter control, imaging device, lens, memory, communications electronics, control electronics, processor, etc.

Yet another alternative embodiment allows provided camera functions to be included within the standard body of a host device. For example, any one or more of the functions and parts described herein for the provided camera can be incorporated into the cell phone at a time of original manufacture. By allowing redundant or additional hardware or software for the camera function the user may be provided with faster access to the camera function, lower power requirements, higher accuracy or resolution, etc. As described in more detail below, the various components and functions of the provided camera can work in addition to or in conjunction with any existing camera and picture functions within the host device.

DETAILED DESCRIPTION

Figure 1:
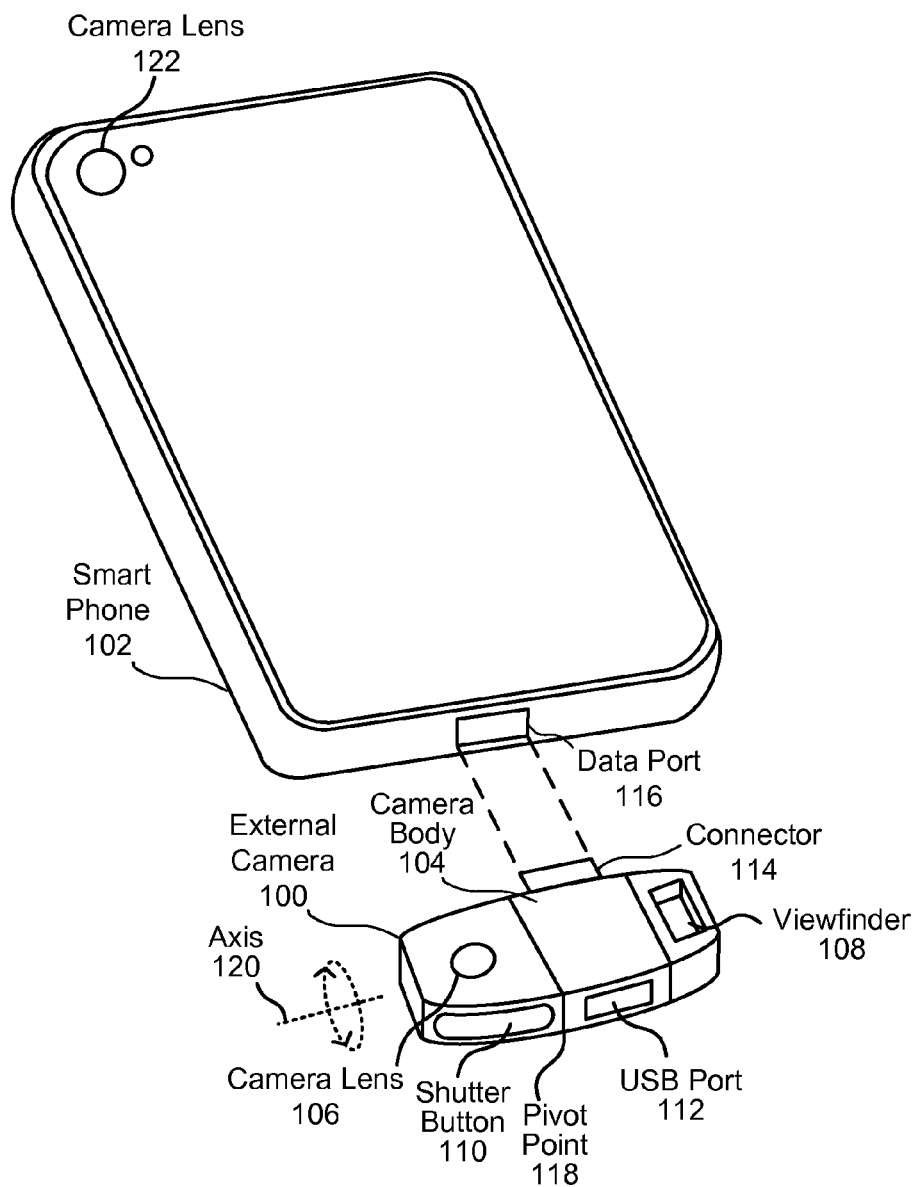
FIG. 1 illustrates a perspective-view diagram of an example external camera, which is detached from a smart phone, according to one embodiment.

Embodiments described herein enable provide different levels of camera improvement or functionality. Typically, a device such as a cell phone or tablet has a camera that takes a few seconds to access. Often in those few second the opportunity to take a picture has been lost. Any improvement in speed, simplicity, cost or other advantage of taking a picture can be valuable to a user. In some embodiments, the provided camera functionality facilitates taking instant or near-instant pictures or videos (i.e., reduced waiting time for the camera or host device to respond).

In one embodiment, a small external digital camera is mounted onto a smart phone. Even when the smart phone is off or in sleep mode, a user may quickly take pictures or videos using the external camera. In one embodiment, the external camera has a connector for mounting the external camera onto a smart phone and for enabling the external camera to communicate with the smart phone. A viewfinder, or even a simple through-hole for framing a picture, can be included in the external camera so that the user does not have to wait for the host device's display screen to power up before composing and taking a picture. In a particular embodiment, the external camera also has a dedicated shutter button for triggering the external camera to capture images or videos. When the shutter button is pressed, the external camera captures pictures or videos, and also activates the smart phone and initiates putting the smart phone into a camera mode. However, while the smart phone is powering up and transitioning to a camera mode the user can already be taking pictures with the external camera. The external camera can transfer pictures and videos to the smart phone via wired or wireless communications. If desired, a user may eventually switch to taking pictures using the smart phone or use applications of the smart phone in conjunction with taking pictures using the external camera.

Any suitable type of connector can be used to secure the camera to the smart phone or other host device. For example, a Universal Synchronous Bus (USB) connector, mini or micro-USB connector or other standard plug, jack or connector, iPhone dock connector or other proprietary connector, serial or parallel port, power connection with data ability, etc. can be used. In other embodiments, the camera can be mounted to the host device by any practicable means such as clipping onto a part of the host device and the mounting does not have to use an existing plug or connector of the host device. The securing can be done all or in part by friction, adhesive, mechanical fastening, magnetic attachment, etc.

The camera also includes a shutter button for triggering the camera to capture the least one image. In some embodiments, the shutter button can be a button on the host device itself if the host device and the camera are in data communication with each other then the act of pressing the host device button can be sent to the camera and the camera can take a picture in response. In a particular embodiment, the act of pressing the shutter button on the camera also activates the phone and begins to put the phone into a camera mode. Once a picture has been taken the picture data can automatically be transferred to the phone. The picture transfer can start immediately upon the camera starting an image capture or the transfer can start at a later time, or need not occur at all until the user performs additional actions such as initiating a file transfer later on.

FIG. 1 illustrates a perspective-view diagram of an example external camera 100, which is detached from a smart phone 102, according to one embodiment. As shown, external camera 100 includes a camera body 104, a camera lens 106, a viewfinder 108, a shutter button 110 (also referred to as an electronic shutter release button), a universal serial bus (USB) port 112, and a connector 114. Viewfinder 108 facilitates a user in aiming external camera 100 when taking pictures. In one embodiment, viewfinder 108 may have an aspect ratio that is the same aspect ratio (e.g., same height-width proportions) as the display screen on the smart phone.

In one embodiment, viewfinder 108 may merely be a through-hole that approximates the field of view of capture of the external camera. Such a simple viewfinder can have advantages, for example, such that a display screen does not need to be powered up prior to use, or that viewfinder optics need not be fabricated into the external camera. In other embodiments, the viewfinder may take on different forms such as by including electronics or optics, as desired.

Camera lens 106 enables external camera 100 to capture images. As described in more detail below, shutter button 110 triggers camera 100 to capture images. Images may include picture (photographic) images and video images. Connector 114 enables external camera 100 to be to mounted onto smart phone 102 and provides both a physical mounting and an electrical signal connection. Such a dual-purpose connection allows data to be exchanged between components within smart phone 102 and external camera 100. In other embodiments, other types of connectors or mountings can be used to secure (either removably or permanently) the external camera to the phone. The method of mounting may allow an electrical connection so that data or other signals can be exchanged, or the mounting may be only mechanical so that hardwired signals are not provided by the mounting. In cases where hardwired signal exchange is not provided (in whole or in part) then wireless communications between the phone and the external camera components can be used for data exchange.

In FIG. 1, the phone's back side is shown. As is known in the art, the back side of a typical smartphone is the side that includes the main camera and flash. The front side of a smartphone (not shown) would include the display screen for user touch input and also a front-facing camera that is usually of a lower resolution than the back-facing camera. In the embodiment shown in FIG. 1, the external camera 100 has a lens that is positioned in the same direction as the back-facing camera lens 122 of the phone. This arrangement allows the user to view the display screen of the phone while pointing the lens of the external camera in the desired direction to take a picture and also use the viewfinder without having to turn the phone over. In other embodiments, the external camera lens 100 may be positioned in the same direction as the phone's front-facing camera, as desired.

In one embodiment, external camera 100 may pivot at line 118 and around axis 120 in order to enable camera lens 106 to face the other side of smart phone 102. In one embodiment, external camera 100 may have a second shutter button (not shown) on the opposite portion of external camera 100. As such, when external camera 100 is pivoted, the second shutter button is in an accessible location (e.g., where shutter button 110 is shown). In various embodiments, smart phone 102 may have a single camera lens 122 as well as a second camera lens (not shown) on the back side of smart phone 102.

For ease of illustration, embodiments of FIG. 1 and other figures described herein show particular camera components. Various embodiments may not have all of the components shown and/or may have other elements including other types of camera components instead of, or in addition to, those shown herein. Also, the various camera components may be positioned and/or configured in various ways, depending on the particular implementations.

Figure 2:
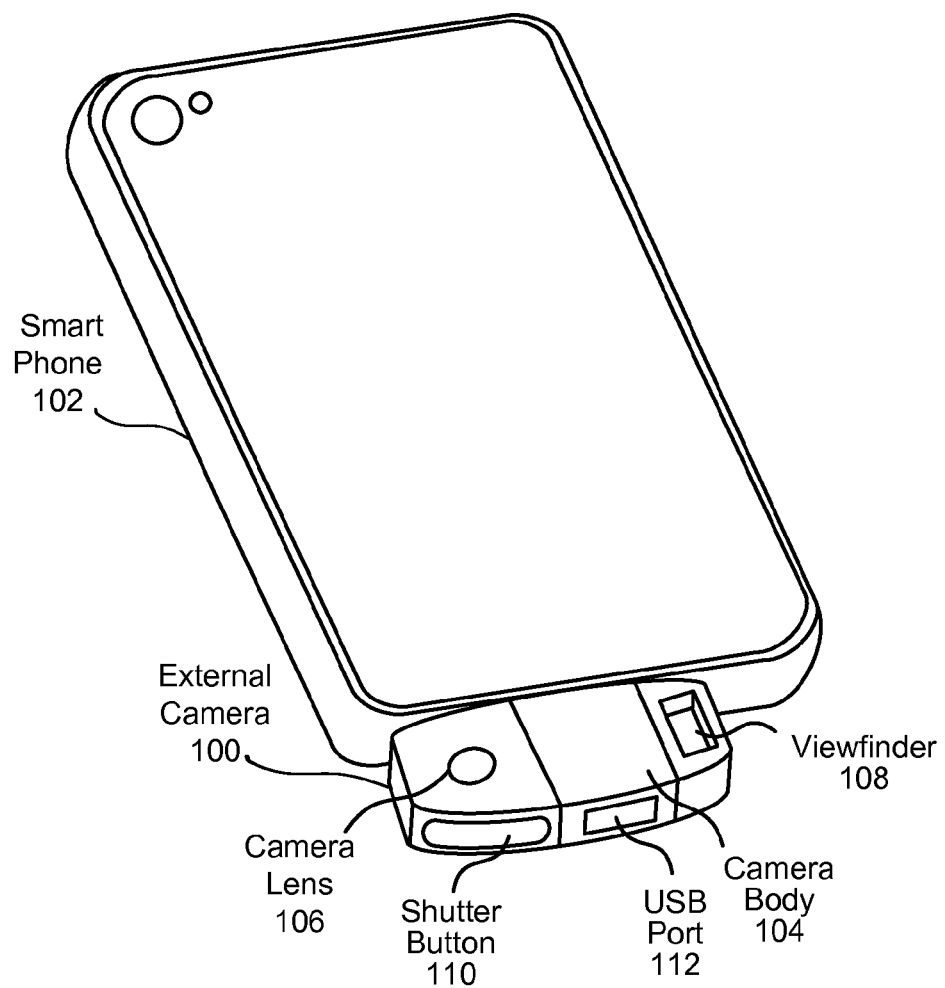
FIG. 2 illustrates a perspective-view diagram of the external camera, which is attached to the smart phone, according to one embodiment.

FIG. 2 illustrates a perspective-view diagram of external camera 100, which is attached to the smart phone 102, according to one embodiment. In various embodiments, external cameral 100 stays mounted on smart phone 102 by default. In one embodiment, connector 114 (not shown) includes electronic circuitry that enables connector 114 to function as a data port. For example, in one embodiment, once mounted onto smart phone 102, external camera 100 may communicate with smart phone 102 via connector 114. In one embodiment, the electronic circuitry of connector 114 makes a mechanical contact with (internal within camera body 104) to USB port 112. In various embodiments, external camera 100 enables smart phone 102 to detect and communicate with a USB device when the USB device is connected to USB port 112. This enables external camera 100 to function as an intermediary device between smart phone 102 and another external device, as data and control signals may be routed between data port 116 of smart phone 102 and USB port 112. A benefit of USB port 112 is that smart phone 102 can communicate with camera 100 and another external device simultaneously using the same data port 116. In one embodiment, camera 100 may also communicate with another external device via USB port 112.

While embodiments are described herein in the context of external camera 100 communicating with smart phone 102 via connector 114, other ways for communicating are possible. For example, in one embodiment, external camera 100 may include circuitry for wireless communication (e.g., Bluetooth), which external camera 100 may use to communicate with smart phone 102 or other external devices.

As shown in FIG. 2, external camera 100 is mounted onto the end of smart phone 102. In alternative embodiments, external camera 100 may be mounted onto other portions of a smart phone (e.g., on the side, etc.) where a smart phone data port may exist. Other locations are also possible. For example, in embodiments involving wireless communication, external camera 100 may be integrated into the body of a smart phone (e.g., in the phone back plate). In some embodiments, external camera 100 may be integrated into a case for a smart phone. Embodiments directed to external camera 100 being integrated into a smart phone case is described in more detail below in connection with FIG. 5. In some embodiments, external camera 100 may be mounted onto or integrated into a flip-out portion or a slide-out portion of a smart phone, where a user may slide or rotate the flip-out portion or slide-out portion of the smart phone to activate the external camera.

Figure 3:
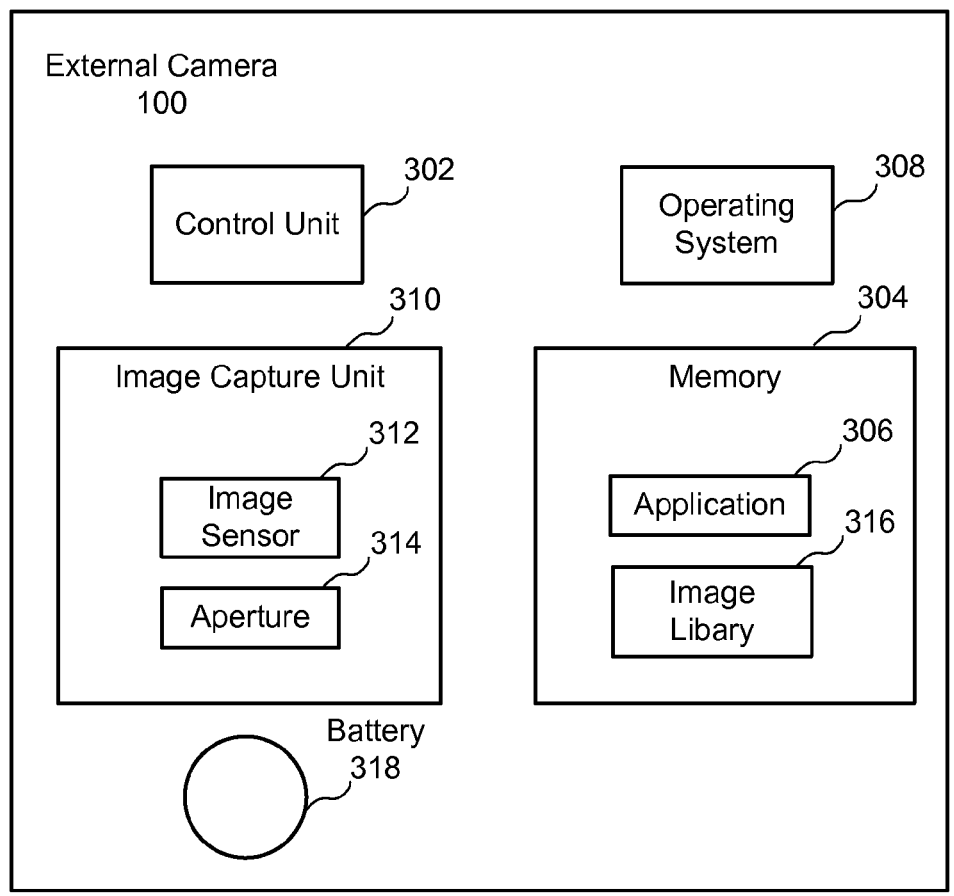
FIG. 3 illustrates a block diagram of the external camera, which may be used to implement the embodiments described herein.

FIG. 3 illustrates a block diagram of the external camera 100, which may be used to implement the embodiments described herein. In one embodiment, external camera 100 may include a control unit 302, a memory 304, and an application 306. Application 306 may be stored on memory 304 or on any other suitable storage location or computer-readable medium or storage device. In one embodiment, memory 304 is a non-volatile memory (e.g., random-access memory (RAM), flash memory, etc.). Application 306 provides instructions that enable control unit 302 to perform the functions described herein. In one embodiment, external camera 100 may include an operating system 308, and control unit 302 may include a processor (not shown). In one embodiment, control unit 302 may include logic circuitry (not shown) in addition to or in lieu of a processor.

In one embodiment, external camera 100 also includes an image capture unit 310, which includes an image sensor 312 and an aperture 314. Image sensor 312 captures images when image sensor 312 is exposed to light passing through camera lens 106 (FIGS. 1 and 2). Aperture 314 regulates light passing through camera lens 106. In one embodiment, after external camera 100 captures images, external camera 100 may store the images in an image library 316 in memory 304.

In one embodiment, external camera 100 may be powered by a battery 318 (e.g., button/coin cell battery). In one embodiment, external camera 100 may also be powered by a smart phone when mounted/connected.

In other embodiments, external camera 100 may not have all of the components listed and/or may have other components instead of, or in addition to, those listed above.

The components of external camera 100 shown in FIG. 3 may be implemented by one or more processors or any combination of hardware devices, as well as any combination of hardware, software, firmware, etc. For example, once the smart phone is on, a processor and application on the smart phone may be used to control external camera 100.

Figure 4:
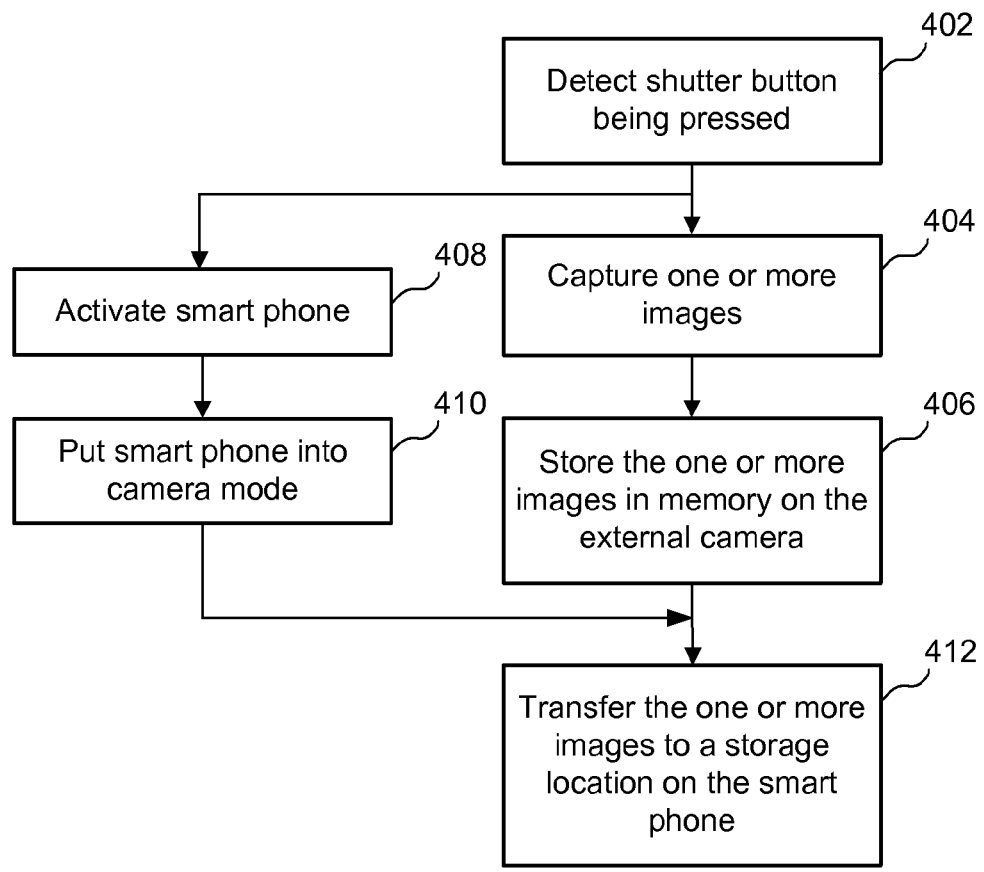
FIG. 4 illustrates an example simplified flow diagram showing the operation of an external camera, according to one embodiment.

FIG. 4 illustrates an example simplified flow diagram showing the operation of external camera 100, according to one embodiment. Referring to FIGS. 1-4, a method is initiated in block 402, where external camera 100 detects shutter button 110 being pressed (e.g., as a user presses shutter button 110).

In block 404, external camera 100 captures one or more images in response to detecting shutter button 110 being pressed. In one embodiment, pressing shutter button 110 both activates external camera 100 and triggers external camera 100 to capture images. Images may include pictures (e.g., one or more images) or video (e.g., a series of images). In other words, multiple images may include multiple picture/photo images or video images.

In block 406, external camera 100 stores the one or more images in memory 304 on external camera 100. In one embodiment, the images go into image library 316 of memory 304.

In block 408, external camera 100 activates smart phone 102. Even when smart phone 102 is still off or in sleep mode, a user may quickly take pictures or video using external camera 100 while waiting for smart phone 102 to become activated. In one embodiment, external camera 100 automatically activates smart phone 102 when shutter button 110 is initially pressed to capture images. The activation of the phone by the external camera can be done as soon as possible so that the delay in the phone being placed into it's camera mode or application is reduced. The phone can be activated or otherwise placed into its camera mode from the phone's off state, hibernating or sleep state, low-power or power-saving state, and from a state of executing any non-camera application (e.g., email, voice, game, web browsing, etc.).

In block 410, external camera 100 puts smart phone 102 into camera mode. In one embodiment, camera mode includes both picture and video functionality. In one embodiment, putting smart phone 102 into camera mode may include navigating to a camera application on smart phone 102. In one embodiment, control unit 302 of external camera 100 navigates to the camera application and launches the camera application. In another embodiment, control unit 302 of external camera 100 causes smart phone 102 to navigate to the camera application and to launch the camera application.

As shown in FIG. 4, the process along the path of steps 404 and 406 may occur substantially simultaneously as the process along the path of steps 408 and 410.

Although the steps, operations, or computations may be presented in a specific order, the order may be changed in particular embodiments. For example, in various embodiments, the process along the path of steps 404 and 406 may occur before the process along the path of steps 408 and 410, and vice versa, depending on the specific implementation. Other orderings of the steps are possible, depending on the particular implementation. In some particular embodiments, multiple steps shown as sequential in this specification may be performed at the same time.

Once the phone application is launched, the user may take pictures with either external camera 100 or smart phone 102, or both. In one embodiment, the user may use the display screen of smart phone 100 as a viewfinder, while taking pictures using external camera 100 and/or smart phone 102. The user may also access various applications on smart phone 102 while taking pictures with external camera 100.

In block 412, external camera 100 transfers the one or more images to a storage location on the smart phone 102. In one embodiment, external camera 100 automatically transfers all images stored on external camera 100 to a storage location on smart phone 102 once smart phone 102 is activated. In one embodiment, once smart phone 102 is activated, external camera 100 may also store images directly in a storage location of smart phone 102 as external camera 100 captures each image. In one embodiment, the images may go into an image library in the storage location of smart phone 102. In one embodiment, external camera 100 may periodically transfer images to a backup location, which may be in memory 304 of external camera 100 or in any suitable storage location on smart phone 102.

In one embodiment, external camera 100 may be programmed by a user to enable the user to manually initiate a transfer of images stored on memory 304 of external camera 100 to the storage location on smart phone 102. Similarly, external camera 100 may be programmed by a user to enable the user to manually initiate a transfer of images stored on smart phone 102 to memory 304 of external camera 100. In one embodiment, external camera 100 may function as a memory stick in that a user may transfer any type of data (in addition to images) from smart phone 102 to external camera 100. In one embodiment, the data (e.g., images) stored on external camera 100 may be transferred directly to a computer. This may be achieved via USB port 112 (FIG. 1) or connector 114 (using appropriate connectors) or wirelessly (e.g., Bluetooth, etc.).

In various embodiments, communication between external camera 100 and smart phone 102 includes transferring data and control signals. The transfer of control signals in both directions (e.g., from external camera 100 to smart phone 102, and from smart phone 102 to external camera 100) enables external camera 100 and smart phone 102 to share control of various functions. For example, as indicated above, external camera 100 may send control signals to smart phone 102 in order to activate smart phone 102, cause smart phone 102 to navigate to a camera application (or other application), and launch the camera application (or other application). In another embodiment, external camera 100 may enable an application (e.g., camera application, etc.) of smart phone 102 to configure external camera 100. For example, control settings stored in smart phone 102 (e.g., auto focus, image stabilization, vibration reduction, flash, lens options, filters, zoom, resolution, etc.) may be used to configure external camera 100 or control various parameters when external camera 100 is used for taking pictures or video. Various applications on smart phone 102 may be used to control external camera 100. In one embodiment, external camera 100 may include a flash. In some embodiments, external camera 100 may use a flash of smart phone 100 while external camera 100 its taking pictures or videos.

In one embodiment, external camera 100 may have default settings or a default settings profile (e.g., auto focus, image stabilization, vibration reduction, flash, lens options, filters, zoom, resolution, etc.), which may be changed using a camera application on smart phone 102.

Embodiments described herein provide various benefits. For example, embodiments enable a user to take pictures instantly without needing to turn a smart phone on and waiting to set up the smart phone for taking pictures. Embodiments of the external camera also take up little additional space on a smart phone.

Embodiments described herein have multiple applications. For example, in one embodiment, external camera 100 and smart phone 102 may be used for stereo camera applications. For example, in one embodiment, external camera 100 and smart phone 102 may implement a 3-dimensional (3D) camera. In one embodiment, external camera 100 provides one camera lens, and smart phone 102 provides another lens, where both external camera 100 and smart phone 102 may take pictures and/or video of the same subject matter simultaneously. The pictures and/or video from each of external camera 100 and smart phone 102 may then be processed (e.g., by control unit 302 of FIG. 3 or by a processor in smart phone 102) for various applications.

In another stereo camera application, external camera 100 and smart phone 102 may be used for sliding games. For example, two or more users, each with a smart phone and attached external camera, may play games with their smart phones, where the users slide their smart phones on a surface (e.g., a table, a floor, etc.). Each smart phone may represent, for example, a vehicle that can race or battle another vehicle/smart phone. In one embodiment, when smart phone 102 with attached external camera 100 is placed on the surface and the camera lenses are facing the surface, external camera 100 and smart phone 102 may take videos of the surface in order to track the relative position of the smart phone 102.

In another stereo application, external camera 100 and smart phone 102 may be used as an optical mouse. Similar to the sliding games application described above, when smart phone 102 with attached external camera 100 is placed on the surface and the camera lenses are facing the surface, external camera 100 and smart phone 102 may take videos of the surface in order to track the relative position of the smart phone 102 as it functions as an optical mouse.

Although the description has been described with respect to particular embodiments thereof, these particular embodiments are merely illustrative, and not restrictive. Any suitable programming language may be used to implement the routines of particular embodiments including C, C++, Java, assembly language, etc. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in whole or in part as executable instructions in a computer-readable storage device (also referred to as a machine-readable storage device) for use by or in connection with an instruction execution system, apparatus, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable processor-readable storage medium or device, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as may be useful in accordance with a particular application. It is also within the spirit and scope to implement a program or code that is stored in a machine-readable storage device to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A camera comprising:
a lens for enabling the camera to capture at least one image;
a connector for mounting the camera onto a phone and for enabling the camera to communicate with the phone; and
a shutter button for triggering the camera to capture the at least one image, wherein a signal generated in response to the shutter button initiates putting the phone into a camera mode, wherein the at least one image is transferred to a storage location on the phone, and wherein at least one image is transferred from the storage location on the phone to a storage location on the camera.

2. The camera of claim 1, wherein the camera transfers the at least one image to the storage location on the phone when the phone is activated.

3. The camera of claim 1, further comprising a universal serial bus (USB) port.

4. The camera of claim 1, further comprising a universal serial bus (USB) port, wherein the USB port enables the phone to communicate with the camera and another device simultaneously using a same data port on the phone.

5. The camera of claim 1, further comprising an image sensor for capturing the at least one image when the image sensor is exposed to light passing through the lens.

6. The camera of claim 1, wherein the at least one image comprises video images.

7. The camera of claim 1, further comprising a viewfinder, wherein the viewfinder has an aspect ratio that is a same aspect ratio as a display screen on the phone.

8. A method comprising:
detecting a shutter button on a camera being pressed;
capturing at least one image;
storing the at least one image in a storage location on the camera;
activating a phone;
putting the phone into a camera mode;
transferring the at least one image to a storage location on the phone; and
transferring at least one image from the storage location on the phone to the storage location on the camera.

9. The method of claim 8, wherein putting the phone into a camera mode comprises:
navigating to a camera application on the phone; and
launching the camera application.

10. The method of claim 8, wherein putting the phone into a camera mode comprises:
navigating to a camera application on the phone; and
launching the camera application, wherein the camera causes the phone to navigate to the camera application and to launch the camera application.

11. The method of claim 8, wherein the at least one image comprises video images.

12. The method of claim 8, wherein communication between the camera and the phone includes transferring data and control signals.

13. The method of claim 8, further comprising enabling an application on the phone to configure the camera.

14. An apparatus comprising:
a processor; and
logic encoded in one or more tangible media for execution by the processor, and when executed operable to:
detect a shutter button on a camera being pressed;
capture at least one image;
store the at least one image in a storage location on the camera;
activate a phone;
put the phone into a camera mode;
transfer the at least one image to a storage location on the phone; and
transfer at least one image from the storage location on the phone to the storage location on the camera.

15. The apparatus of claim 14, wherein the logic when executed is further operable to:
navigate to a camera application on the phone; and
launch the camera application.

16. The apparatus of claim 14, wherein the logic when executed is further operable to:
navigate to a camera application on the phone; and
launch the camera application, wherein the camera causes the phone to navigate to the camera application and to launch the camera application.

17. The apparatus of claim 14, wherein the at least one image comprises video images.

18. The apparatus of claim 14, wherein communication between the camera and the phone includes transferring data and control signals.

19. The apparatus of claim 14, wherein the logic when executed is further operable to enable an application on the phone to configure the camera.

20. A camera comprising:
a lens for enabling the camera to capture at least one image;
a viewfinder;
a data transfer circuit to allow the camera to communicate with the phone; and
a shutter button for triggering the camera to capture the at least one image, wherein the camera also activates the phone and puts the phone into a camera mode when the shutter button is pressed, wherein the at least one image is transferred to a storage location on the phone, and wherein at least one image is transferred from the storage location on the phone to a storage location on the camera.

21. The camera of claim 20, wherein the camera is attached to the phone by using a data connector.

22. The camera of claim 20, wherein the camera is attached to the phone by integrating at least a part of the camera into a part of a body of the phone.

23. The camera of claim 20, wherein at least a portion of the camera is inside a body of the phone.

* * * * *